(12) United States Patent
Gupta et al.

(10) Patent No.: US 9,092,472 B1
(45) Date of Patent: Jul. 28, 2015

(54) DATA MERGE BASED ON LOGICAL SEGREGATION

(71) Applicant: AMAZON TECHNOLOGIES, INC., Reno, NV (US)

(72) Inventors: Vinay Gupta, New Delhi (IN); Piyush Raghavji Dedhia, Dombivli (IN); Venkatesh Mohan, Madurai (IN)

(73) Assignee: Amazon Technologies, Inc., Reno, NV (US)

( * ) Notice: Subject to any disclaimer, the term of this patent is extended or adjusted under 35 U.S.C. 154(b) by 214 days.

(21) Appl. No.: 13/926,375

(22) Filed: Jun. 25, 2013

(51) Int. Cl.
*G06F 17/30* (2006.01)

(52) U.S. Cl.
CPC .... *G06F 17/30345* (2013.01); *G06F 17/30365* (2013.01); *G06F 17/30557* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,924,094 | A * | 7/1999 | Sutter | 1/1 |
| 6,446,092 | B1 * | 9/2002 | Sutter | 1/1 |
| 2005/0171811 | A1 * | 8/2005 | Campbell et al. | 705/1 |
| 2005/0234935 | A1 * | 10/2005 | Barsness et al. | 707/100 |
| 2006/0085374 | A1 * | 4/2006 | Mayes et al. | 707/1 |
| 2006/0173917 | A1 * | 8/2006 | Kalmick et al. | 707/104.1 |
| 2007/0050385 | A1 * | 3/2007 | Young et al. | 707/100 |
| 2007/0078792 | A1 * | 4/2007 | Chen | 705/400 |
| 2012/0109892 | A1 * | 5/2012 | Novik et al. | 707/633 |
| 2012/0221367 | A1 * | 8/2012 | Chen | 705/7.11 |
| 2012/0317150 | A1 * | 12/2012 | Coverston et al. | 707/802 |
| 2014/0244591 | A1 * | 8/2014 | Zhou | 707/661 |

\* cited by examiner

*Primary Examiner* — Cam-Linh Nguyen
(74) *Attorney, Agent, or Firm* — Lindauer Law, PLLC (57) ABSTRACT

Described herein are systems, computer readable mediums, and methods for merging a source file with a target table using different merging processes. The source file may be logically segregated into new records and update records. The update records may be logically segregated into a first update record section and a second update record section. The target table may be logically segregated into a target table section. In one implementation, a server may use a hash merging process to merge the first update record section with the target table section and use an index merging process to merge the second update record section with the target table.

20 Claims, 7 Drawing Sheets

DATA MERGE BASED ON LOGICAL SEGREGATION

BACKGROUND

Data warehouses may store large amounts of data from many resources. The resources may include databases having tables of data. In a data warehousing environment, tables may be merged to add records or to update existing records. As databases continue to grow in size, the time and resources consumed during the merging process increases. Accordingly, a need exists for the further development of database systems which quickly merge tables.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems and methods for increasing the efficiency of merging databases. Databases are organized according to database models. Database models determine the logical structure of databases, and determine the manner in which data may be stored, organized, and manipulated. Database models may include models such as relational models and non-relational models. Non-relational models may include models such as key-value pair models, object models, network models, and so forth. The tables discussed herein are relational tables based on the relational model. However, in some implementations, these techniques may be applied to non-relational models.

Relational databases include relational tables organized according to a relational model. Data stored in relational tables may be visualized by an administrator as organized in columns and rows. In one implementation, a particular row of a relational table comprises a record. The record may include information in one or more fields of data representing a transaction. The transaction may include a new order or an update to an existing order.

In some implementations, a server is configured to merge data present in a source file with data in an existing target table. The source file may comprise source file records which are used to update target table records. In some implementations, merging the source file with the target table may include adding records to the target table using new records, or updating at least a portion of existing target table records using update records.

The server may be configured to segregate the update records into two different update record sections. As discussed in more detail below, by segregating the update records, the server may apply different merging processes to the different update record sections. In one example, the source file may include update record data which includes 3,000,000 ("3M") update records. The server may be configured to segregate the 3M update records into a first update record section having 2,970,000 update records, and a second update record section having 30,000 update records.

The source file is configured to receive source file records resulting from different events. These received source file records are then added or used to update certain existing target table records. For example, the source file may receive a new source file record in response to a user updating information for a previously placed order. For example, after placing an order for one widget on a first date, the user may change the order from one widget to three widgets at a later date. In this example, the source file receives a source file record, representing the change to the order. In another example, the user may add a new shipping address to a user account. In this example, the source file may receive a source file record, representing the change of the address.

As discussed above, the server may segregate the update records into two different update record sections. Each time the update records are segregated, the number of update records segregated into each update record section may be different. In one example, the server may enable an administrative user to specify a percentage data which may dictate the amount of update records segregated into each of the update record sections. The administrative user may want to set a specific percentage for the first update record section based on a historical analysis of previous sets of update records. For example, the administrative user may want 99% of all the update records segregated into the first update record section because these update records are associated with recently added or updated target table records, and the remaining 1% of update records are associated with older target table records. In one example, the server may be configured to merge the source files with the target tables once a month. For a first month, the server may be configured to segregate the update records such that 99% of the update records are segregated into the first update record section. For a second month, the server may be configured to allocate 97% of the update records into the first update record section. In another example, the update records may be different based on the total amount of transactions. For example, in a first month, the total quantity of update records may include 3M update records. In a second month, the total quantity of update records may include 4M update records. Where the server is configured to segregate the update records such that the first update record section includes 99% of the update records, the quantity of update records for the first month and the second month will be different because of the increase in the quantity of update records for the second month.

Using one or more of the update record sections, the server may generate cutoff data. The cutoff data may comprise data used to logically segregate the target table. In one example, the cutoff data represents a cutoff date. The cutoff date may be determined using the oldest date associated with the update records of the first update record section.

Using the target table section data, the server may be configured to logically segregate the target table, resulting in one or more designated target table sections. The target table section may comprise a portion of the target table records of the target table. However, the one or more target table sections remain part of the original target table. In one example, the target table may include 13,000,000,000 ("13B") target table records. The server may be configured to logically segregate the 13B target table records into a target table section having 2,500,000,000 ("2.5B") target table records.

Once the target table has been logically segregated, the server may apply a first merging process to the first update record section and the target table section, and apply a second merging process to the second update record section and the entire target table. In some implementations, the first merging process includes a hash merging process and the second merging process includes an index merging process. The hash merging process may involve generating hash tables, which use hash functions to generate indexes. Generally, hash merging may provide a quick method to find rows of a table by scanning a hash table, rather than scanning an entire table. The index merging process may involve generating an index to optimize speed and performance in finding relevant target table records in order to update the relevant target table records.

Generating a hash table for large tables may consume many resources and may take a large amount of time to complete. Using the hash merging and the index merging processes, the overall merge timing is reduced when compared to only applying the hash merging process to each of the update records and the entire target table. The overall merge timing is reduced because the overall computational process is reduced. The overall computational process is reduced compared to generating a hash table for the entire target table and each of the update records. Rather than generating the hash table for the entire target table and each of the update records, the server is generating the hash table for the first update record section and the target table section.

Merging table data in relational databases may provide a variety of benefits. For example, the target table records may be stored in a data warehouse and may be used by a plurality of users for a plurality of different applications. By merging the source file records with the target table records, the target table records may store accurate and current records. Further, merging data may reduce storage requirements by reducing duplicate records. Furthermore, by using the techniques described herein, these merges may be performed more quickly and with fewer computational resources.

Illustrative System

Figure 1:
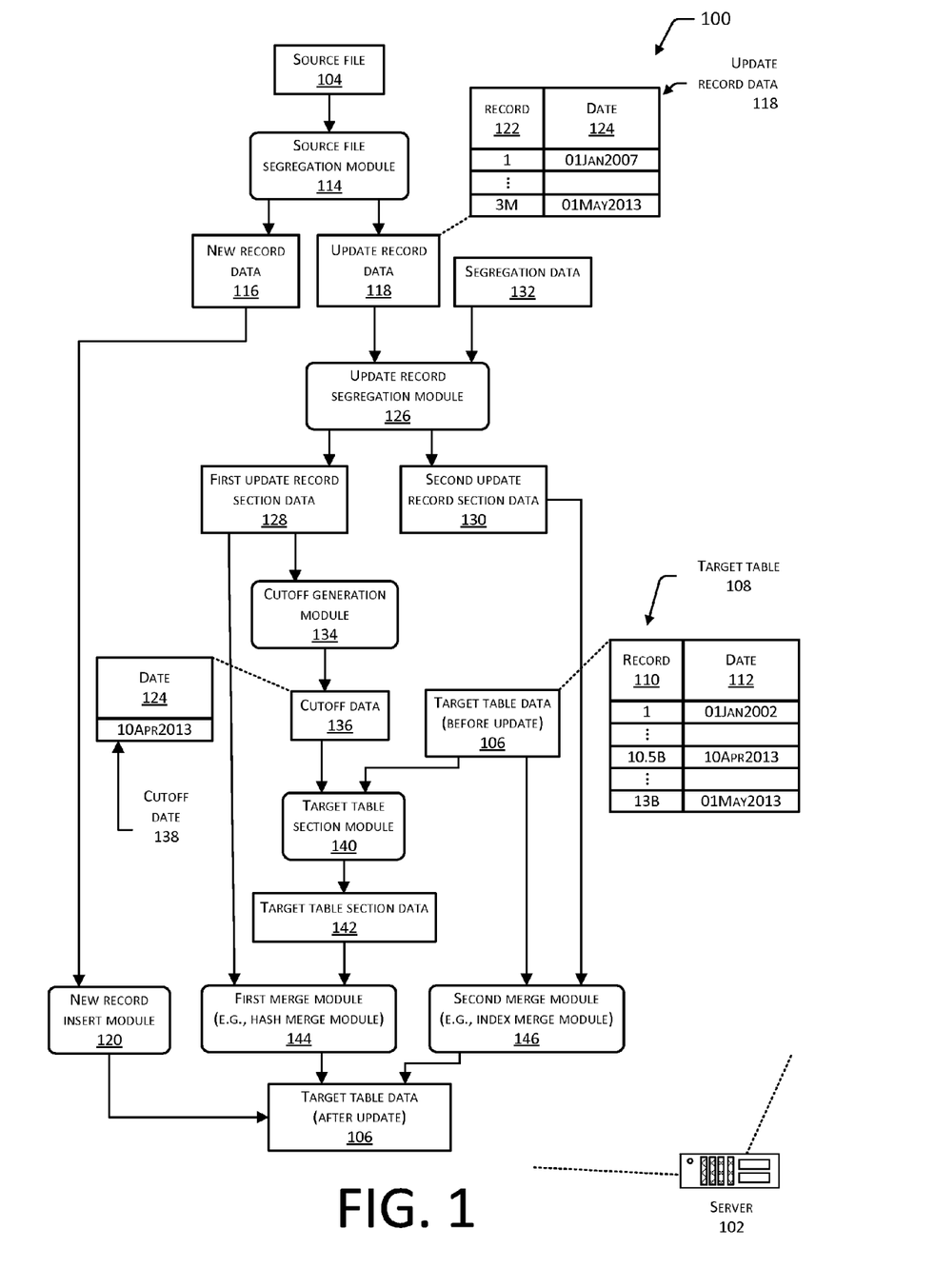
FIG. 1 is a block diagram of a server configured to merge a source file with target table data using different merging processes.

FIG. 1 is a block diagram 100 of a server 102 configured to merge a source file 104 with target table data 106 using different merging processes. In one example, the target table data 106 comprises a table stored in a data warehouse. During one or more merging processes, the target table data 106 stored in the data warehouse may be updated using information received from the source file 104.

As shown in FIG. 1, the target table data 106 may comprise a target table 108. The rows of the target table 108 comprise target table records 110, which may represent previous transactions or previously placed orders for products. The target table records 110 comprise information in one or more data fields. By way of illustration, as shown in FIG. 1, the target table 108 includes 13B target table records 110 that comprise target table dates 112, which are data fields.

The source file 104 may comprise source file records (not shown). The source file records represent updates or additions to the target table 108. In this implementation, the source file 104 includes 11M source file records (not shown).

The source file 104 and the target table 108 may include relational tables, which include information arranged in one or more data structures, wherein the placement within those data structures conveys meaning. For example, an operator may visualize the relational tables as information organized in columns and rows, with columns being a particular attribute and rows being a particular record. In some implementations, the source file 104 further comprises other data such as metadata about the source file records, and the target table data 106 further comprises other data such as metadata about the target table 108.

The source file records (not shown) may be added to the source file 104 based on one or more events occurring over a period of time. As discussed in more detail below, these received source file records are then added to, or used to update, certain existing target table records 110. For example, the source file 104 may receive a new source file record in response to a user updating information for a previously placed order. Continuing the example, after placing an order for one widget on a first date, the user may add another item to the order at a later date. In this example, a source file record is added to the source file 104, representing the change to the order. In another example, the user may change the address associated with a user account. In this example, a source file record is added to the source file 104, representing the change of the address.

The server 102 may include several modules. In this implementation, the server 102 includes a source file segregation module 114 configured to segregate the source file records into new record data 116 and update record data 118. Once the new record data 116 is segregated, a new record insert module 120 may be configured to insert or add the new record data 116 into the target table 108.

The update record data 118 may comprise update records 122, which represent updates to the target table 108. The update records 122 comprise information in one or more data fields. By way of illustration, as shown in FIG. 1, the update record data 118 includes 3M update records 122 comprising update record dates 124, which are data fields. Other examples of information in fields of data which may be included in the update records 122 are discussed in more detail below with regard to FIG. 2. Continuing with the example, the source file segregation module 114 may segregate the 11M source file records into the new record data 116, which includes 7M new records (not shown), and the update record data 118, which includes 3M update records 122. The new record insert module 120 may insert the 7M new records into the target table 108.

In this implementation, the update record dates 124 identify the target table dates 112 associated with the target table records 110 for which the update records 122 are configured to update. For example, the update record date 124(1) is 01Jan2007. The 1 Jan. 2007 date indicates that the update record 122(1) is an update for a certain target table record 110 (not shown) which may have been added or last updated on 1 Jan. 2007. In another example, the update record date 124(3M) for the update record 122(3M) is 01May2013. The 1 May 2013 date indicates that the update record 122(3M) is an update for a certain target table record 110 (not shown) which may have been added or last updated on 1 May 2013. Other examples of information in fields of data which may be included in the update records 122 are discussed in more detail below with regard to FIG. 2.

Using the update records 122, an update record segregation module 126 may segregate the update records 122 into two or more different sections. For example, as shown in FIG. 1, the update record segregation module 126 segregates the update records 122 into first update record section data 128 and second update record section data 130.

The update record segregation module 126 may segregate the update records 122 using segregation data 132. In this implementation, the segregation data 132 comprises data for designating two or more portions of the update records 122. In one implementation, the segregation data 132 may comprise time period data (not shown) representative of a requested period of time for the update records 122 of the first update record section data 128. Continuing with the example, the source file segregation module 114 segregates the 11M source file records into 3M update records 122. As illustrated in FIG. 1, these 3M update records 122 are associated with update record dates 124 ranging from 1 Jan. 2007 to 1 May 2013. In this example, today's date is 1 May 2013. The server 102 may receive the time period data (not shown) indicating a request for the first update record section data 128 to include the update records 122 associated with the last three weeks (i.e., from 10 Apr. 2013 to 1 May 2013). In this example, using the received time period data, the update record segregation module 126 may segregate the update records 122 into the first update record section data 128, which includes the update records 122 associated with update record dates 124 ranging from 10 Apr. 2013 to 1 May 2013. In this example, the update record segregation module 126 segregates the update records 122 into the second update record section data 130, which includes the update records 122 associated with update record dates 124 ranging from 1 Jan. 2007 to 10 Apr. 2013.

In another example, the segregation data 132 comprises input percentage data (not shown), which indicates one or more percentages associated with the amount of update records 122 of the first update record section data 128. In one example where the update record data 118 includes 3M update records 122, the server 102 may receive input percentage data indicating a request for the first update record section data 128 to include 99% of the update records 122. In this example, using the received input percentage data, the update record segregation module 126 may segregate the update records 122 into the first update record section data 128 having 2,970,000 (i.e., 99% of 3M) update records 122, and the second update record section data 130 having 30,000 (i.e., 1% of 3M) update records 122. In one implementation, an administrative user may want to specify the amount of update records 122 for the first update record section data 128 or the second update record section data 130 based on a historical analysis of the update records 122. For example, the administrative user may want the first update record section data 128 to include 97% of the update records 122 because, based on a historical analysis, 97% of the update records 122 are associated with recently added target table records 110.

In one implementation, the segregation data 132 includes data which specifies the amount of update records 122 for the first update record section data 128. For example, the server 102 may receive data indicating a request for the first update record section data 128 to include 2M update records 122.

Using the first update record section data 128, a cutoff generation module 134 determines cutoff data 136, which may be used to logically segregate the target table 108. In this implementation, the cutoff data 136 includes data representative of a cutoff date 138, which is used to logically segregate the target table 108. The cutoff data 136 may be determined using one or more of the update record dates 124 that identify the target table dates 112 associated with the target table records 110 for which the update records 122 are configured to update. For example, the cutoff generation module 134 may determine the cutoff data 136 to include the oldest update record date 124 of the first update record section data 128. As shown in FIG. 1, by way of illustration, the cutoff date 138 indicates 10 Apr. 2013. In this example, 10 Apr. 2013 is the oldest update record date 124 included in the first update record section data 128. Although the cutoff date 138 is presented as a particular day, in other examples, the cutoff date 138 may indicate at least one of a particular week, month, quarter, or year.

In other implementations, the server 102 generates the cutoff data 136 using other data. For example, the server 102 may generate the cutoff data 136 using order number data or sequence data. In some implementations, the cutoff data 136 may include other data such as order ID data, customer data, item ID data, or sequence data. For example, the cutoff data 136 may designate the last 100,000 order numbers.

Using the cutoff data 136, a target table section module 140 determines target table section data 142 which, as discussed in more detail below, is used to merge with the first update record section data 128. The target table section data 142 includes a portion of the target table records 110 of the target table 108. In this implementation, the portion of the target table records 110 of the target table section data 142 is associated with dates between a designated date and the cutoff date 138. An example target table section which includes target table records 110 associated with dates between the designated date and the cutoff date 138 is discussed in more detail below with regard to FIG. 4. The designated date may comprise the date on which the target table section module 140 determines the target table section data 142. The designated date may be after the cutoff date 138. Continuing with the example, the designated date may comprise the date 1 May 2013, and the cutoff date 138 may comprise 10 Apr. 2013.

In FIG. 1, a first merge module 144 merges the first update record section data 128 with the target table section data 142, and a second merge module 146 merges the second update record section data 130 with the target table data 106.

The first merge module 144 may comprise a hash merge module configured to hash merge the first update record section data 128 with the target table section data 142. In one implementation, the hash merge module may use a hash table to map keys to values. The hash table may use a hash function to compute an index into an array of buckets. In one implementation, the hash merge module selects the first update section record data 128 and generates a hash table by applying a hash algorithm to the values of a hash key. In this implementation, the update records 122 of the first update record section data 128 are inserted into a hash bucket based on the hash value computed for the hash key. The target table records 110 of the target table section data 142 are then scanned one row at a time, and a hash key value is computed for matching hash buckets.

The second merge module 146 may comprise an index merge module configured to index merge the second update record section data 130 with the target table data (before update) 106. In one implementation, the index merge module may generate an index for one or more columns of one or more of the update records 122 or the target table 108. The index may be generated by scanning each row of the one or more update records 122 or target table 108. The index may optimize speed and performance in finding relevant target table records 110 in order to update.

After the server 102 has applied the first merging process and the second merging, and the new record insert module 120 has inserted the new record data 116, target table data (after update) 106 is generated. In this implementation, the server 102 applies the first merging process before the second merging process. In other implementations, the server 102 may apply the second merging process before the first merging process.

Figure 2:
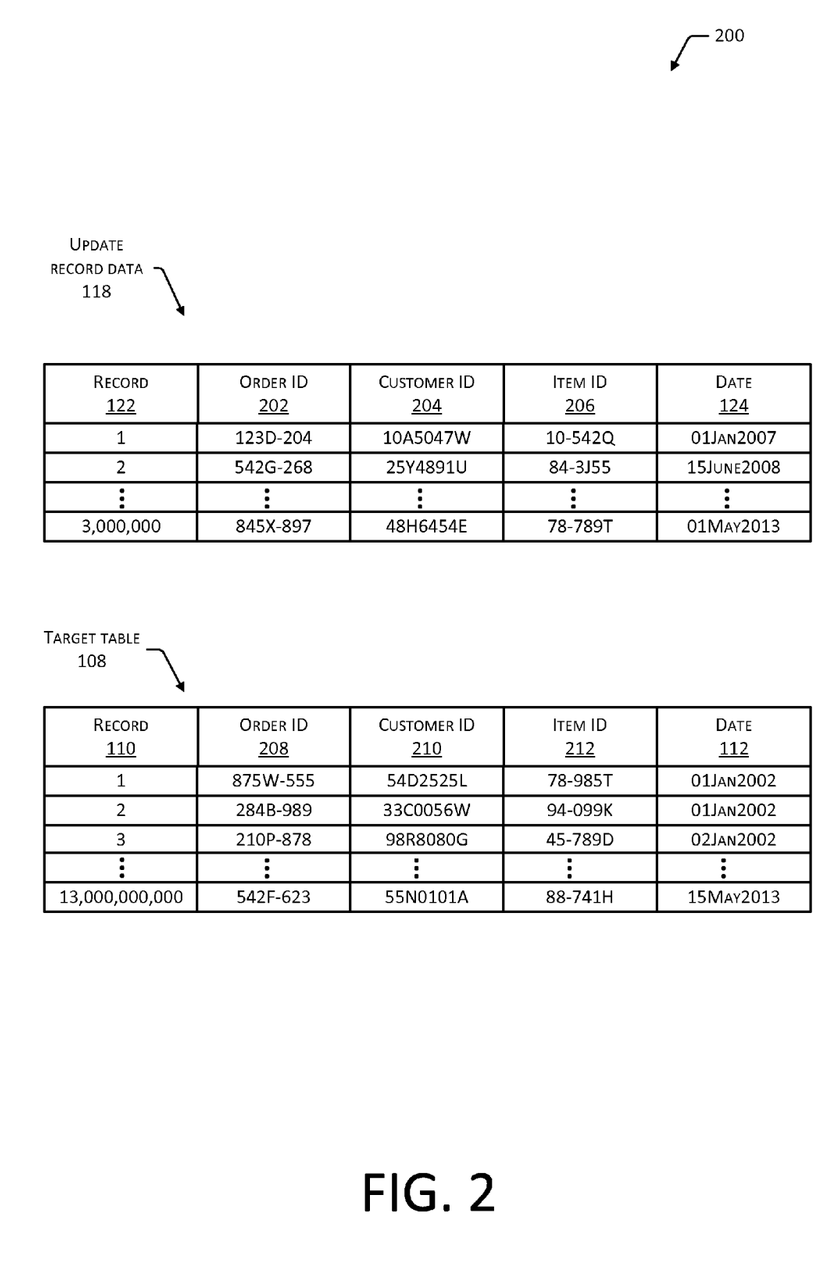
FIG. 2 illustrates the update record data having a plurality of field data, and the target table having a plurality of target table field data

FIG. 2 illustrates examples of the update record data 118 and the target table 108. The update record data 118 and target table 108 in this illustration are relational tables. Relational tables include data which may be characterized as being organized in columns and rows. The rows of the update record data 118 and the target table 108 represent records. In FIG. 2, update record data 118 comprises the update records 122, and the target table 108 comprises the target table records 110.

As discussed above, the update record data 118 may comprise information in one or more fields of data. In FIG. 2, the fields of data include order IDs 202, customer IDs 204, item IDs 206, and the update record dates 124. The order IDs 202 may include data representative of a unique identifier associated with a purchase of a product. For example, the order ID 202(1) for the update record 122(1) is 123D-204, and the order ID 202(3M) for the update record 122(3M) is 845X-897.

The customer IDs 204 may include data representative of a unique identifier associated with a user. For example, the customer ID 204(1) for the update record 122(1) is 10A5047W, and the customer ID 204(3M) for the update record 122(3M) is 48H6454E.

The item IDs 206 may include data representative of a unique identifier associated with an item purchased by the user. For example, the item ID 206(1) for the update record 122(1) is 10-542Q, and item ID 206(3M) for the update record 122(3M) is 78-789T.

As discussed above, the update record dates 124 may indicate the target table date 112 associated with the target table record 110 for which the update records 122 are configured to update. For example, the update record date 124 for the update record 122(1) is 01Jan2007. The 1 Jan. 2007 date indicates that the update record 122(1) is an update for a target table record 110 associated with a target table date 112 of 1 Jan. 2007 (not shown). In another example, the update record date 124(3M) for the update record 122(3M) is 01May2013. The 1 May 2013 date indicates that the update record 122 (3M) is an update for a target table record 110 associated with a target table date 112 of 1 May 2013 (not shown).

As discussed above, the target table records 110 may comprise information in one or more fields of data. In FIG. 2, the fields of data include order IDs 208, customer IDs 210, item IDs 212, and the target table dates 112.

The order IDs 208 may include data representative of a unique identifier associated with a purchase of a product. For example, the order ID 208(1) for the target table record 110(1) is 875W-555, and the order ID 208(13B) for the target table record 110(13B) is 542F-623.

The customer IDs 210 may include data representative of a unique identifier associated with a user. For example, the customer ID 210(1) for the target table record 110(1) is 54D2525L, and the customer ID 210(13B) for the target table record 110(13B) is 55N0101A.

The item IDs 212 may include data representative of a unique identifier associated with an item purchased by the user. For example, the item ID 212(1) for the target table record 110(1) is 78-985T, and item ID 212(13B) for the target table record 110(13B) is 88-741H.

As discussed above, the target table dates 112 may indicate the date in which the target table records 110 were added to the target table 108. For example, as shown in FIG. 2, the target table record 110(1) was added to the target table 108 on 1 Jan. 2002, and the target table record 110(13B) was added to the target table 108 on 15 May 2013.

Figure 3:
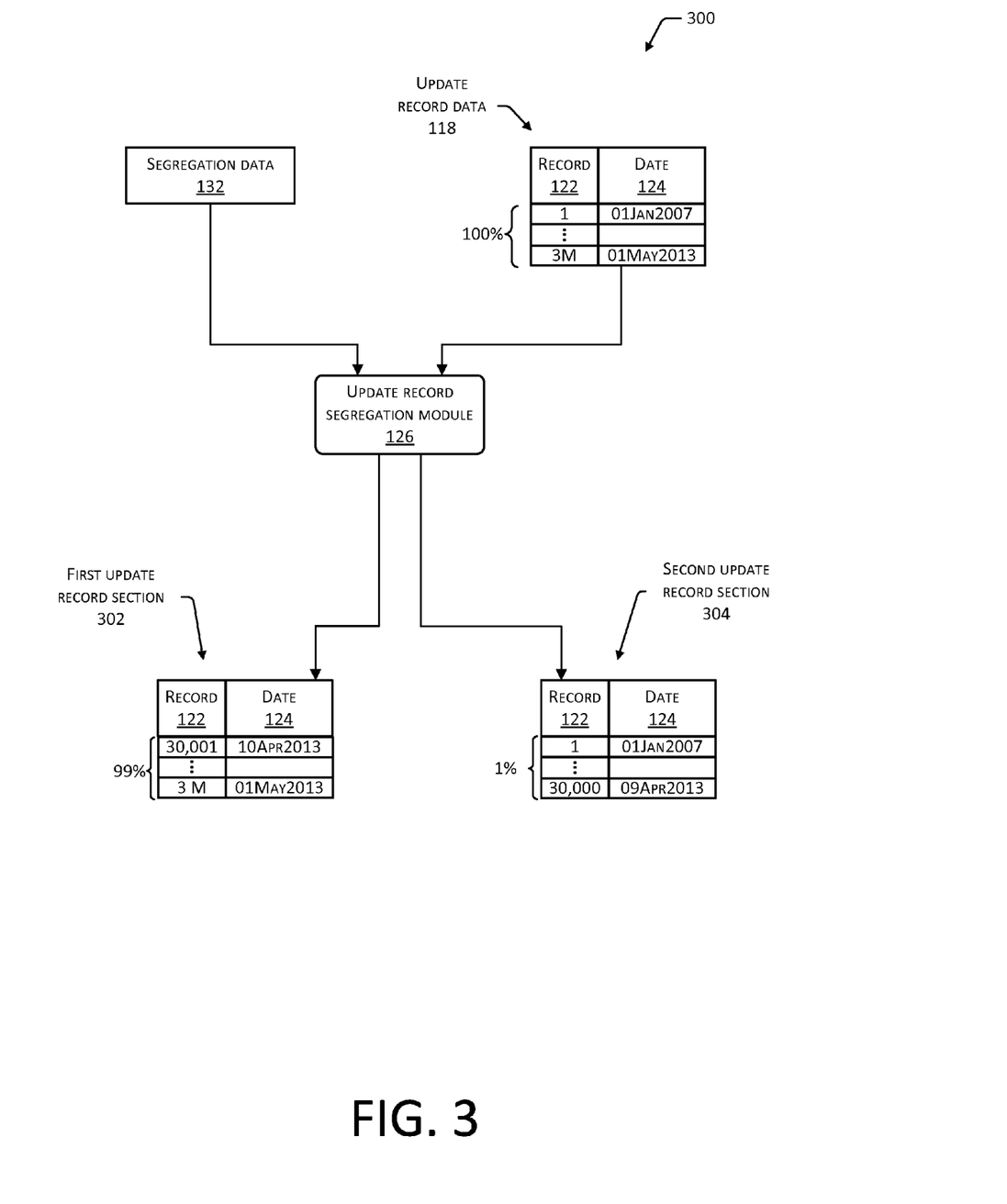
FIG. 3 is a block diagram of the update record segregation module segregating the update record data into a first update record section and a second update record section, illustrating the first update record section including 99% of the update records.

FIG. 3 is a block diagram of the update record segregation module 126 segregating the update record data 118 into a first update record section 302 and a second update record section 304, illustrating the first update record section 302 including 99% of the update records 122. The segregation of the update records 122 may be visualized as a logical segregation as opposed to a literal segregation. In other words, the source file 104 continues to contain the information found in the first update record section 302 and the second update record section 304. However, the sections designate particular portions of the update records 122 in the source file 104.

In FIG. 3, the segregation data 132 and the update record data 118 are used as inputs to the update record segregation module 126. As discussed above, in one example, the segregation data 132 may comprise time period data (not shown) representative of a requested period of time for the update records 122 of the first update records section data 128. In another example, the segregation data 132 may include input percentage data (not shown), which indicates one or more percentages associated with the amount of update records 122 of the first update record section data 128.

In FIG. 3, the update record data 118 comprises 3M update records 122. As illustrated, the update record dates 124 range from 1 Jan. 2007 to 1 May 2013. Using the segregation data 132, the update record segregation module 126 segregates the update record data 118 into the first update record section 302 and the second update record section 304. By segregating the update record data 118, the server 102 may apply different merging processes to the first update record section 302 and the second update record section 304. The segregation of the update record data 118 is logical as opposed to literal. That is, the update record data 118 continues to contain the information found in the first update record section 302 and the second update record section 304. However, the sections designate particular portions of the update records 122 in the update record data 118.

In one example, the segregation data 132 includes input percentage data (not shown) which indicates a request for the first update record section 302 to include 99% of the update records 122. As shown in FIG. 3, the first update record section 302 includes 99% of the update records 122. The 99% of the update records 122 range from the update record 122 (30,001) to the update record 122(3M). The second update record section 304 includes the remaining 1% of the update records 122. The 1% of the update records 122 range from the update record 122(1) to the update record 122(30,000).

As discussed above, an administrative user may want to set a specific percentage for the first update record section 302 based on a historical analysis of previous sets of update records 122. For example, the administrative user may want 99% of all the update records 122 segregated into the first update record section 302 because these update records 122 are associated with recently added or updated target table records 110, and the remaining 1% of update records 122 are associated with older target table records 110.

Figure 4:
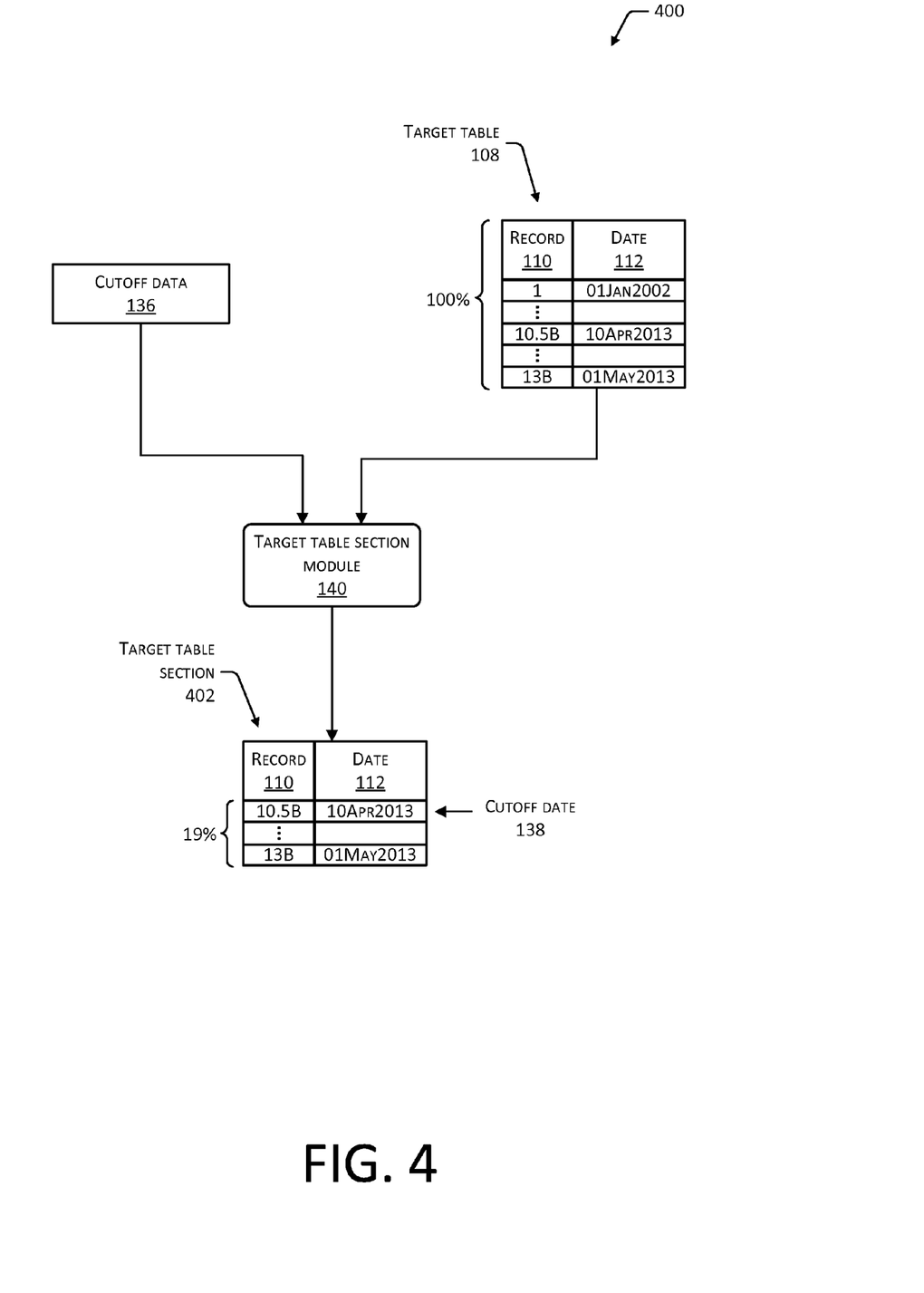
FIG. 4 is a block diagram of the target table section module determining a target table section using the cutoff data.

FIG. 4 is a block diagram 400 of the target table section module 140 determining a target table section 402 based on the cutoff data 136. In FIG. 4, the cutoff data 136 and the target table 108 are used as inputs to the target table section module 140. As described above, the cutoff data 136 may represent the cutoff date 138. In this example, the cutoff date 138 is determined to be the oldest update record date 124 of the update records 122 included in the first update record section 302. In some implementations, the cutoff data 136 may not represent the cutoff date 138 and may be determined based on fields of data such the order ID 202, the customer ID 204, and the item ID 206.

Using the cutoff data 136 such as the cutoff date 138 the target table section module 140 determines the target table section 402. As illustrated in FIG. 4, the target table section 402 includes a portion of the target table records 110 of the target table 108. In FIG. 4, the target table section 402 includes 2.5B of the target table records 110 or 19% of the target table records 110. In this example, each target table record 110 of the target table section 402 is associated with a target table date 112 that is on or after the cutoff date 138. In this example, the cutoff date 138 was previously determined to be 10 Apr. 2013.

Figure 5:
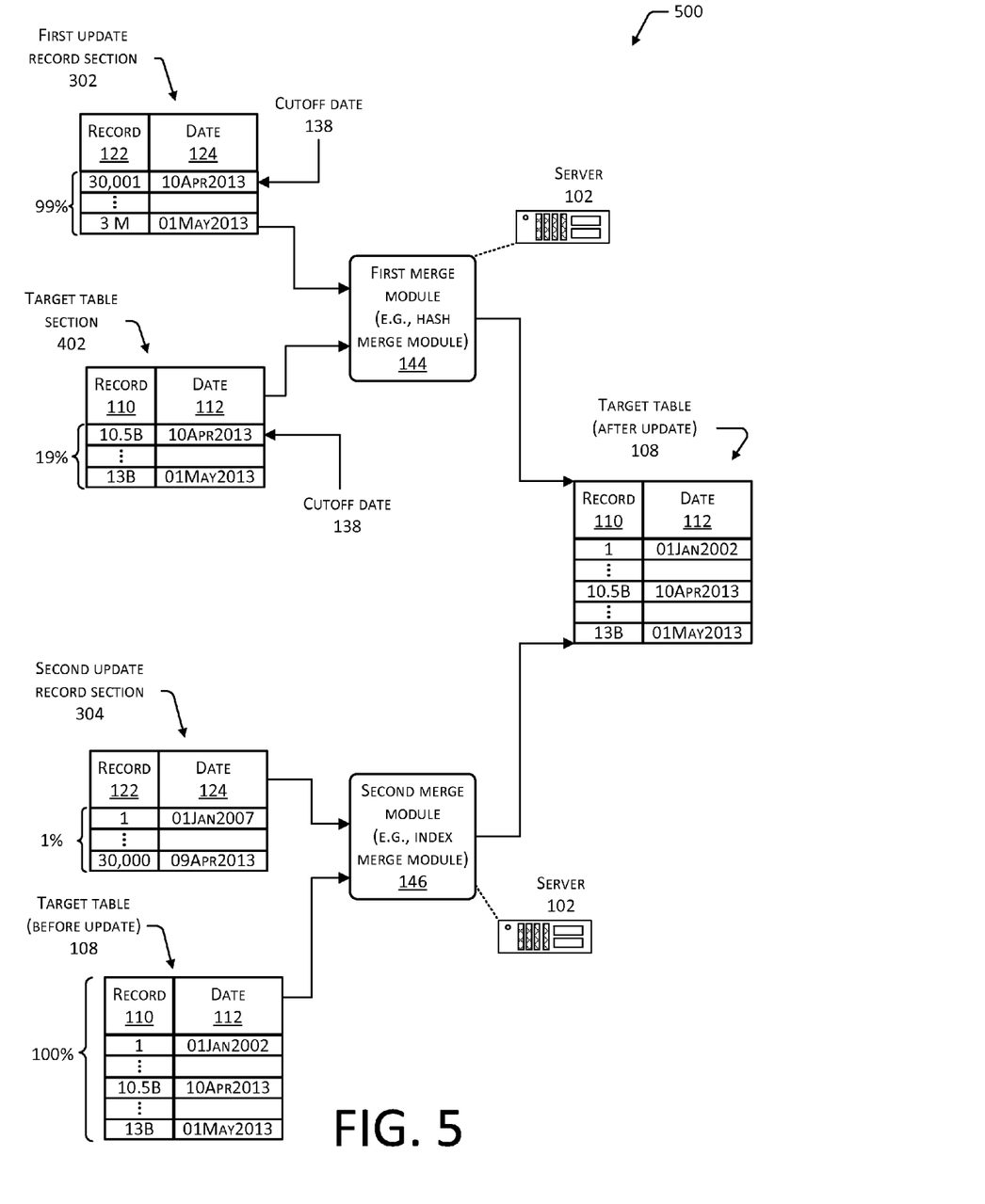
FIG. 5 is a block diagram of the target table being updated using different merging processes.

FIG. 5 is a block diagram 500 of the target table 108 being updated using different merging processes. The first update record section 302 and the target table section 402 are used as inputs to the first merge module 144. Continuing with the example, the first update record section 302 may include 99% of the update records 122. The target table section 402 may include 2.5B target table records 110 or 19% of the target table records 110 of the target table 108.

The second update record section 304 and the target table (before update) 108 are used as inputs to the second merge module 146. Continuing with the example, the second update record section 304 may include 1% of the update records 122. The target table 108 may include 13B target table records 110.

In this implementation, the first merge module 144 is configured to hash merge the first update record section 302 with the target table section 402. The second merge module 146 is configured to index merge the second update record section 304 with the target table 108. In FIG. 5, after the hash merging process and the index merging process, the target table records 110 are updated based on the update records 122. Because the server 102 applied the two different merge processes to the different table sections, the overall merge timing is reduced compared to a scenario where only a hash merge process is applied to the entire table. The overall merge timing is reduced because the server 102 does not generate a hash table for the entire target table 108. The hash table is generated for only a portion of the target table 108 (i.e., the target table section 402). That is, in FIG. 5, the hash table is generated for only 2.5B target table records 110 and not all 13B target table records 110.

Figure 6:
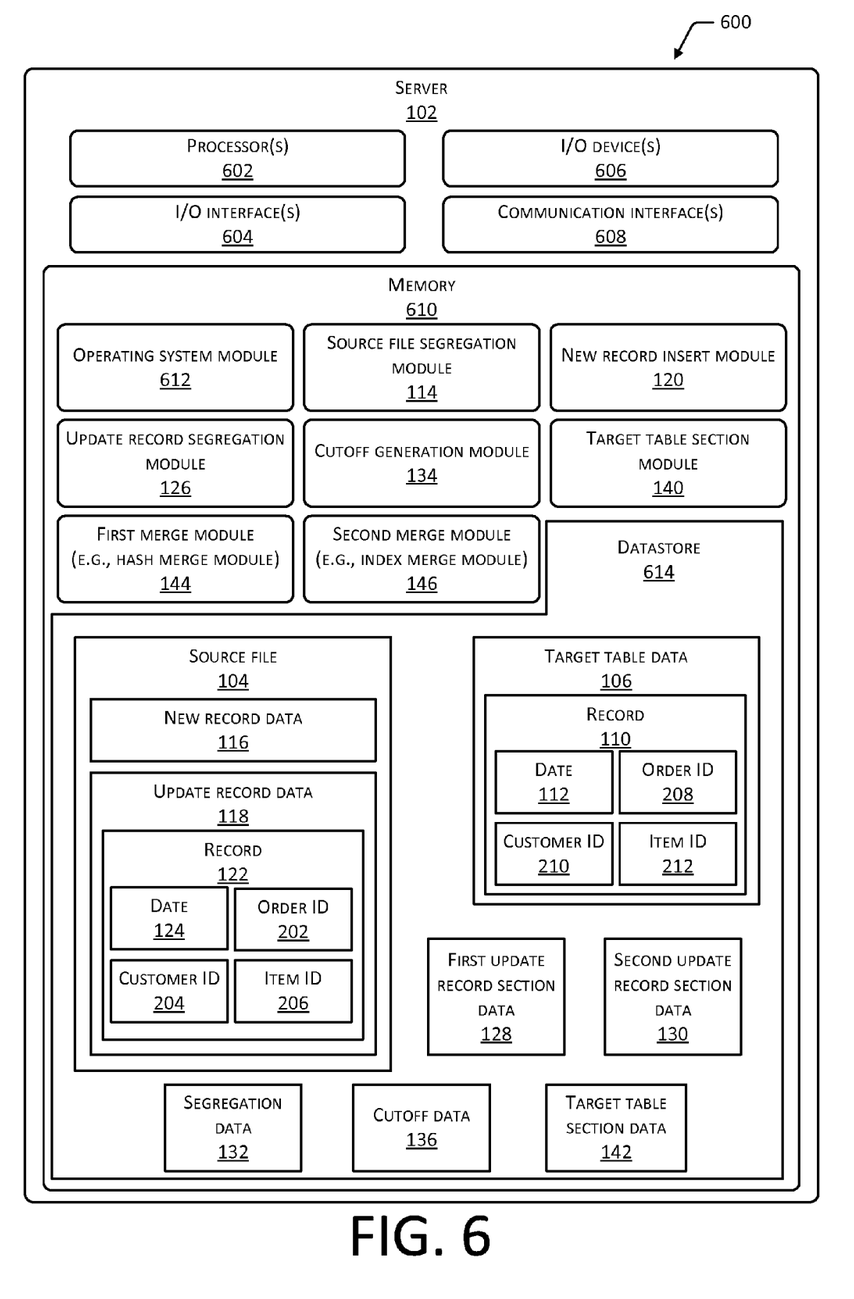
FIG. 6 is a block diagram of the server configured to merge the first update record section data with the target table section, and the second update record section data with the target table data.

FIG. 6 is a block diagram 600 of the server 102, which is configured to insert the new record data 116 into the target table 108, merge the first update record section data 128 with the target table section data 142, and merge the second update record section data 130 with the target table data (before update) 106. The server 102 may include at least one processor 602 configured to execute stored instructions. The at least one processor 602 may comprise one or more cores.

The server 102 may include at least one input/output ("I/O") interface 604 that enables portions of the server 102 (e.g., the processor 602) to communicate with other devices. The I/O interface 604 may include Inter-Integrated Circuit ("I2C"), Serial Peripheral Interface bus ("SPI"), Universal Serial Bus ("USB") as promulgated by the USB Implementers Forum, RS-232, and so forth. The at least one I/O interface 604 may be communicatively coupled to at least one I/O device 606. In some implementations, certain I/O devices 606 are physically incorporated with the server 102 or externally placed.

The server 102 may include at least one communication interface 608. The communication interface 608 may be configured to provide communications between the server 102 and other devices, such as routers, access points, other servers 102, and so forth. The communication interface 608 may connect to one or more networks. The server 102 may include at least one bus or other internal communications hardware or software that enables for the transfer of data between the various modules and components of the server 102.

As illustrated in FIG. 6, the server 102 may include at least one memory 610. The memory 610 may include at least one computer-readable storage media ("CRSM"). The CRSM may include at least one of an electronic storage medium, a magnetic storage medium, an optical storage medium, a quantum storage medium, or a mechanical computer storage medium. The memory 610 may include computer readable instructions, data structures, program modules, and other data for the operation of the server 102.

The memory 610 may include at least one operating system ("OS") module 612. The OS module 612 may be configured to manage hardware resources such as the I/O interface 604, the I/O device 606, the communication interface 608, and provide various services to applications or modules executing on the processor 602. The memory 610 may also store at least one of the following modules which may be executed as foreground applications, background tasks, or daemons.

The memory 610 may include the source file segregation module 114, which is configured to segregate the source file 104 into the new record data 116 and the update record data 118. In one implementation, the source file segregation module 114 determines whether the source file records (not shown) of the source file 104 are new records or update records 122 based on key data. For example, each source file record may include data representative of a key which may correspond to a second key located in the target table 108. In one example, when a particular key of a source file record matches a key in the target table 108, the source file segregation module 114 determines that the source file record is an update record 122. If the particular key of the source file record does not match any key in the target table 108, the source file segregation module 114 may determine that the source file record is a new record. The memory 610 may include the new record insert module 120, which is configured to insert or add the new records of the new record data 116 to the target table 108.

The memory 610 may also include the update record segregation module 126. As discussed above, the update record segregation module 126 may be configured to logically segregate the update record data 118 into different sections. In some implementations, the update record segregation module 126 segregates the update record data 118 using the segregation data 132.

The memory 610 may include the cutoff generation module 134. The cutoff generation module 134 may be configured to generate the cutoff data 136. In some implementations, the cutoff generation module 134 generates the cutoff data 136 using one or more of the update records 122 of at least one of the first update record section 302 or the second update record section 304. For example, the cutoff generation module 134 may determine the cutoff data 136 to be the oldest update record date 124 included in the first update record section data 128.

The memory 610 may include the target table section module 140. As discussed above, the target table section module 140 may be configured to determine the target table section data 142. The target table section data 142 may include a portion of the target table records 110 of the target table 108. As discussed above, the target table records 110 of the target table 108 may include target table records 110 associated with dates between a designated date and the cutoff date 138. The designated date may comprise the date on which the target table section module 140 determines the target table section data 142. The designated date may be after the cutoff date 138.

The memory 610 may include the first merge module 144. As discussed above, the first merge module 144 may be configured to merge the first update record section data 128 with the target table section data 142. The first merge module 144 may comprise a hash merge module configured to hash merge the first update record section data 128 with the target table section data 142. The hash merge module may be configured to merge the first update record section data 128 with the target table section data 142 by generating one or more hash tables which use hash functions to generate indexes.

The memory 610 may include the second merge module 146. As discussed above, the second merge module 146 may be configured to merge the second update record section data 130 with the target table data 106. The second merge module 146 may comprise an index merge module configured to index merge the second update record section data 130 with the target table data 106. The index merge module may generate an index to optimize speed and performance in finding relevant target table records 110 for updates.

In some implementations, the memory 610 includes a datastore 614 for storing information. The datastore 614 may use a flat file, database, linked list, executable code, tree or other data structure to store the information. In some implementations, the datastore 614, or a portion thereof, may be distributed across at least one other device, such as another server, a network storage device, and so forth. As illustrated in FIG. 6, the datastore 614 may include the source file 104, the target table data 106, the first update record section data 128, the second update record section data 130, the segregation data 132, the cutoff data 136, and the target table section data 142.

As discussed above, the source file 104 may comprise source file records and metadata about the source file records (not shown). The source file 104 may include a relational table which includes information that may be visualized as being organized in columns and rows.

The update records 122 may comprise information in one or more fields of data. For example, the update records 122 may include at least one of the update record dates 124, the order IDs 202, the customer IDs 204, and the item IDs 206. As discussed above, the update record date 124 indicates the target table date 112 associated with the target table record 110 for which the update record 122 is configured to update.

The order IDs 202 may include data representative of a unique identifier associated with a purchase of a product. The customer IDs 204 may include data representative of a unique identifier associated with a user. The item IDs 206 may include data representative of a unique identifier associated with an item purchased by the user.

In some implementations, the update records 122 may include other data (not shown). For example, the other data may include at least one of the following: address data representative of shipping addresses for ordered products; shipping data indicating the type of shipping for ordered products; or packaging data representative of types of packaging requests for ordered products.

The target table data 106 may comprise the target table 108 and metadata about the target table 108. The target table 108 may be a relational table, which includes information that may be visualized as being organized in columns and rows. The rows of the target table 108 may comprise the target table records 110. The target table records 110 may represent previous transactions or previously placed orders for products.

As discussed above, the target table records 110 may comprise information in one or more fields of data. For example, the fields of data may include at least one of the target table dates 112, the order IDs 208, the customer IDs 210, and the item IDs 212. The target table dates 112 may represent the dates in which the target table records 110 were added to the target table 108. The order IDs 208 may include data representative of a unique identifier associated with a purchase of a product. The customer IDs 210 may include data representative of a unique identifier associated with a user. The item IDs 212 may include data representative of a unique identifier associated with an item purchased by the user.

The target table records 110 may include other data. For example, the other data may include at least one of the following: address data representative of shipping addresses for ordered products; shipping data indicating the type of shipping for ordered products; or packaging data representative of types of packaging request for ordered products.

The segregation data 132 may comprise data for designating two or more portions of the update record data 118. In some implementations, the segregation data 132 comprises time period data (not shown) representative of a requested period of time for the update records 122 of the first update record section data 128. In some implementations, the segregation data 132 comprises input percentage data (not shown), which indicates one or more percentages associated with the amount of update records 122 of the first update record section data 128.

The first update record section data 128 includes a first portion of the update records 122 of the update record data 118. The second update record section data 130 includes a second portion of the update records 122 of the update record data 118. The segregation of the update record data 118 is logical as opposed to literal. That is, the update record data 118 continues to contain the information found in the first update record section data 128 and the second update record section data 130. However, the sections designate particular portions of the update records 122 in the update record data 118.

The cutoff data 136 may include data representative of the cutoff date 138. The cutoff date 138 may be determined using one or more of the update record dates 124. As discussed above, in some implementations, the server 102 uses data other than the cutoff date 138 to determine how to segregate the target table 108. For example, the server 102 may use the order ID 202 and the order ID 208 to determine how to segregate the target table 108.

The target table section data 142 includes a portion of the target table records 110 of the target table 108. The segregation of the target table 108 is logical as opposed to literal. That is, the target table 108 continues to contain the information found in the target table section data 142. However, the target table section data 142 logically segregates a particular portion of the target table 108.

Figure 7:
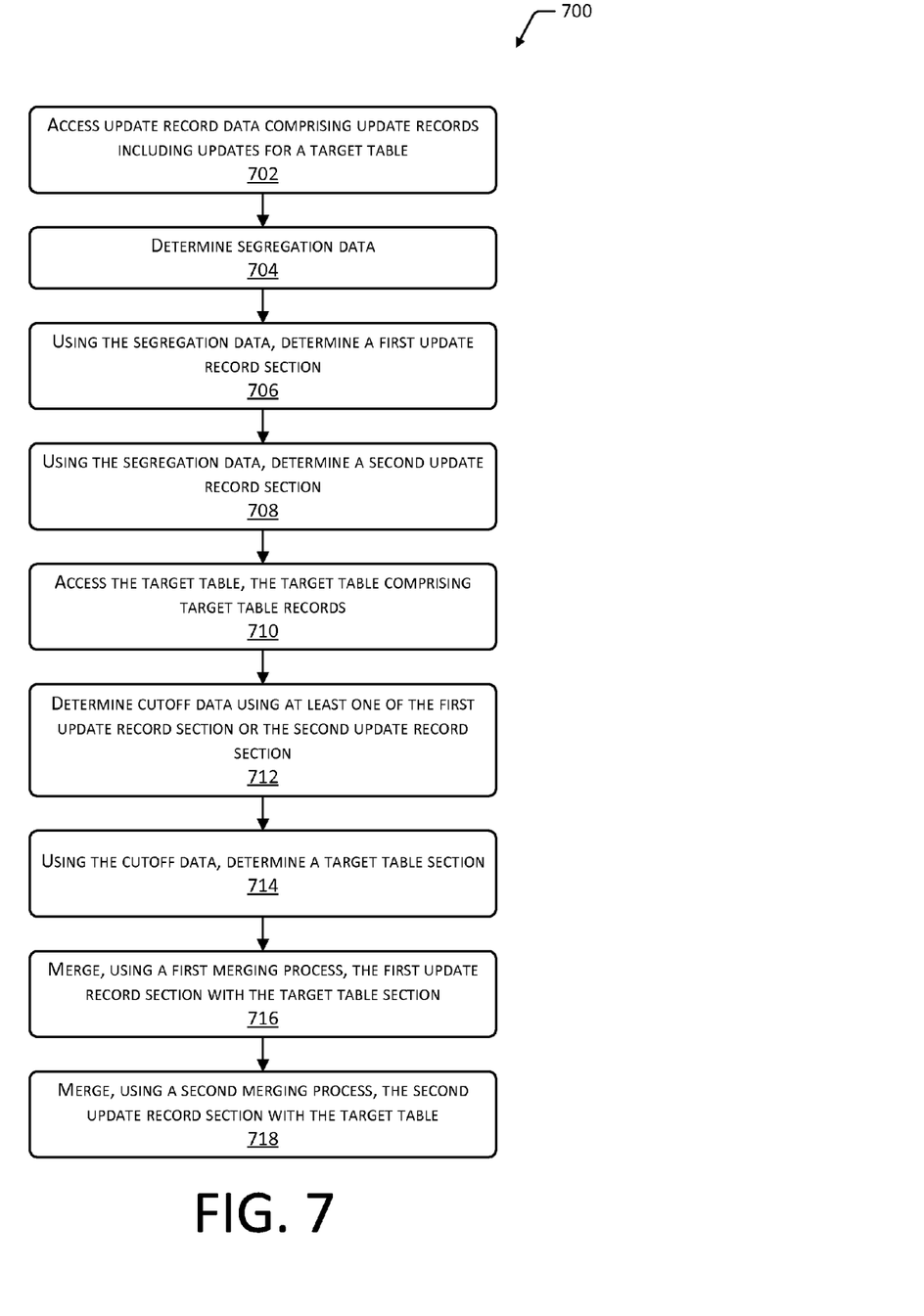
FIG. 7 is a flow diagram illustrating a process of using a first merging process to merge the first update record section with the target table section, and using a second merging process to merge the second update record section with the target table.

FIG. 7 is a flow diagram illustrating a process 700 of using a first merging process to merge information in the first update record section 302 with information in the target table section 402, and using a second merging process to merge information in the second update record section 304 with information in the target table 108. Although the process 700 is described with reference to the flow diagram illustrated in FIG. 7, many other methods performing the acts associated with the process 700 may be used. For example, the order of many of the steps may be changed, some of the steps described may be optional, and additional steps may be included.

At 702, the server 102 accesses the update record data 118 which comprises a plurality of the update records 122. For example, the server 102 may access the update records 122 from the memory 610.

In some implementations, the server 102 may be configured to access the update record data 118 based on at least one of a predetermined date or a predetermined time. For example, the server 102 may be configured to update the target table 108 once every three weeks at midnight.

As discussed above, the update records 122 may comprise updates to the target table 108. For example, a first update record 122 may include data representative of a request to update the user's address which was last updated and stored as a target table record 110 five years ago. In another example, a second update record 122 may include data representing a change to a particular order. For example, the user may change the particular products associated with an order or change the quantity of items ordered.

At 704, the server 102 determines segregation data 132. The segregation data 132 may comprise data for segregating the update record data 118. The segregation data 132 may be determined based on received time period data representative of a requested period of time associated with the update records 122 of the first update record section data 128. For example, the server 102 may receive time period data indicating a request for the first update record section data 128 to include update records 122 having update record dates 124 within the last three months.

In another example, the segregation data 132 may be determined based on received percentage data, which indicates a percentage associated with the amount of the update records 122 of the first update record section data 128. For example, the server 102 may receive percentage data indicating a request for the first update record section data 128 to include 99% of the update records 122.

At 706, using the segregation data 132, the server 102 determines the first update record section 302. The first update record section 302 may comprise a first portion of the update records 122 of the update record data 118.

In one implementation, the update record data 118 includes 3M update records 122 associated with update record dates 124 ranging from 1 Jan. 2007 to 1 May 2013. In this implementation, today's date is 1 May 2013. In one example, the segregation data 132 is determined to include a request for the first update record section data 128 to include the update records 122 that are associated with dates between 1 Feb. 2013 and 1 May 2013. In this example, the first update record section 302 may comprise the portion of update records 122 that are associated with dates between 1 Feb. 2013 and 1 May 2013. In another example, the segregation data 132 is determined to include a request for the first update record section data 128 to include 99% of the update records 122 of the update record data 118. In this example, the first update record section 302 may comprise 99% of the update records 122 of the update record data 118.

At 708, using the segregation data 132, the server 102 determines the second update record section 304. The second update record section 304 may comprise a second number of the update records 122 of the update record data 118. Continuing with the example, as discussed above, the first update record section 302 may comprise the portion of update records 122 that are associated with dates between 1 Feb. 2013 and 1 May 2013. In this example, the update record table section 304 may comprise the portion of update records 122 of the update record data 118 that are associated with dates between 1 Jan. 2007 and 31 Jan. 2013. In another example, the segregation data 132 is determined to include a request for the first update record section data 128 to include 99% of the update records 122 of the update record data 118. In this example, the second update record section 304 may comprise 1% of the update records 122 of the update record data 118.

At 710, the server 102 accesses the target table 108. For example, the server 102 may access the target table 108 from the memory 610. The target table 108 may comprise the target table records 110. The target table records 110 may represent previous transactions such as orders for products or a user's address.

At 712, the server 102 determines the cutoff data 136 using at least one of the first update record section 302 or the second update record section 304. The cutoff data 136 may comprise data for logically segregating the target table 108. In one implementation, the server 102 determines the cutoff data 136 using the oldest update record date 124 of the first update record section data 128. In some implementations, the cutoff data 136 is representative of the cutoff date 138.

At 714, the server 102 determines, using the cutoff data 136, the target table section 402. The target table section 402 may comprise a portion of the target table records 110 of the target table 108. For example, where the target table 108 includes 13B target table records 110, the target table section 402 may include 2.5B of the 13B target table records 110. In some implementations, the target table records 110 of the target table section 402 include dates between the cutoff date 138 and a designated date. The designated date may be after the cutoff date 138.

At 716, the server 102 merges, using a first merging process, the first update record section 302 with the target table section 402. In some implementations, the first merging process is a hash merging process. At 718, the server 102 merges, using a second merging process, the second update record section 304 with the target table 108. In some implementations, the second merging process is an index merging process.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer readable medium storing instructions, which when executed by a processor, cause the processor to perform actions comprising:
   logically segregating a source file into new record data and update record data, the new record data comprising new records for a target table, the update record data comprising update records which comprise updates for the target table, the update records being associated with update record dates;
   inserting the new records into the target table;
   logically segregating the update record data into a first update record section and a second update record section, the first update record section including a first number of the update records, the second update record section including a second number of the update records;
   determining a cutoff date, the cutoff date being associated with one or more of the update records of the first update record section;
   accessing the target table, the target table comprising target table records associated with target table dates, the target table records comprising transactions;
   using the cutoff date, determining a target table section, the target table section including a third number of the target table records which are associated with dates between a designated date and the cutoff date, the designated date being after the cutoff date;
   using a first merging process, merging the first update record section with the target table section; and
   using a second merging process, merging the second update record section with the target table.

2. The computer readable medium of claim 1, wherein:
   the first update record section includes at least 99% of the update records;
   the first merging process comprises a hash merging process; and
   the second merging process comprises an index merging process.

3. The computer readable medium of claim 1, further comprising:
   enabling a user to operate with an input device to input time period data representative of a requested period of time for the first number of the update records; and
   logically segregating, using the input time period data, the update records into the first update record section and the second update record section.

4. A computer readable medium storing instructions, which when executed by a processor, cause the processor to perform actions comprising:
   accessing update record data comprising a plurality of update records, the update records comprising updates for a target table;
   determining segregation data, the segregation data comprising data for designating two or more portions of the update record data;
   using the segregation data:
      determining a first update record section, the first update record section comprising a first number of the plurality of update records; and
      determining a second update record section, the second update record section comprising a second number of the plurality of update records;
   accessing the target table, the target table comprising target table records, the target table records comprising transactions;
   determining cutoff data using at least one of the first update record section or the second update record section, the cutoff data comprising data for logically segregating the target table;
   using the cutoff data, determining a target table section, the target table section comprising a third number of the target table records;
   merging, using a first merging process, the first update record section with the target table section; and
   merging, using a second merging process, the second update record section with the target table.

5. The computer readable medium of claim 4, wherein the segregation data further comprises percentage data comprising a percentage associated with the plurality of the update records.

6. The computer readable medium of claim 5, further comprising enabling a user to operate with an input device to change the percentage associated with the plurality of the update records.

7. The computer readable medium of claim 4, further comprising:
   enabling a user to operate with an input device to input time period data representative of a requested period of time for the first number of the plurality of update records; and
   determining, using the input time period data, the first update record section.

8. The computer readable medium of claim 4, wherein:
   the cutoff data comprises a cutoff date; and
   the target table records of the target table section comprises target table records associated with dates between a designated date and the cutoff date, the designated date being after the cutoff date.

9. The computer readable medium of claim 8, wherein the cutoff date is representative of at least one of a particular day, a particular week, a particular month, a particular quarter, or a particular year.

10. The computer readable medium of claim 4, wherein the update records further comprising at least one of:
    address field data representative of shipping addresses for ordered products;
    shipping field data representative of types of shipping for ordered products; or
    packaging field data representative of types of packaging for ordered products.

11. The computer readable medium of claim 4, wherein:
    the first merging process comprises a hash merging process; and
    the second merging process comprises an index merging process.

12. The computer readable medium of claim 4, wherein the first number of the plurality of the update records are different from the second number of the plurality of the update records.

13. The computer readable medium of claim 4, further comprising:
    wherein the target table records include target table dates; and
    determining the target table section of the target table using the target table dates and the cutoff data.

14. A system comprising:
    a processor; and
    a memory device storing instructions, which when executed by the processor, cause the processor to:

access update record data comprising a number of update records, the update records comprising updates for a target table, the target table comprising target table records, the target table records comprising transactions;

using the number of update records, logically segregating the update records into a first update record section and a second update record section;

determine cutoff data, the cutoff data comprising data for logically segregating the target table;

using the cutoff data, determine a target table section, the target table section comprising a number of the target table records;

merge, using a first merging process, the first update record section with the target table section; and merge, using a second merging process, the second update record section with the target table.

15. The system of claim 14, wherein:
the update records are associated with update record dates; and
the instructions, when executed by the processor, cause the processor to determine the cutoff data using one or more of the update record dates.

16. The system of claim 14, further comprising determining the cutoff data using the number of the update records.

17. The system of claim 14, further comprising:
enabling a user to input time period data representing a requested period of time for the first update record section; and
logically segregating, using the requested period of time, the update records into the first update record section.

18. The system of claim 14, further comprising:
enabling a user to input percentage data representing a percentage of update records associated with the first update record section; and
logically segregating, using the percentage, the update records into the first update record section and the second update record section.

19. The system of claim 14, wherein:
the cutoff data includes a cutoff date; and
the target table section records are associated with dates which are on or after the cutoff date.

20. The system of claim 14, wherein:
the first update record section includes update records associated with update record dates, the update record dates including an oldest update record date; and
the target table cutoff data is determined based on the oldest update record date of the first update record section.

* * * * *